Jan. 3, 1956  E. V. GILKEY  2,729,250
PORTABLE SAW TABLE CONTAINING SLIDING PORTION
Filed Oct. 13, 1952
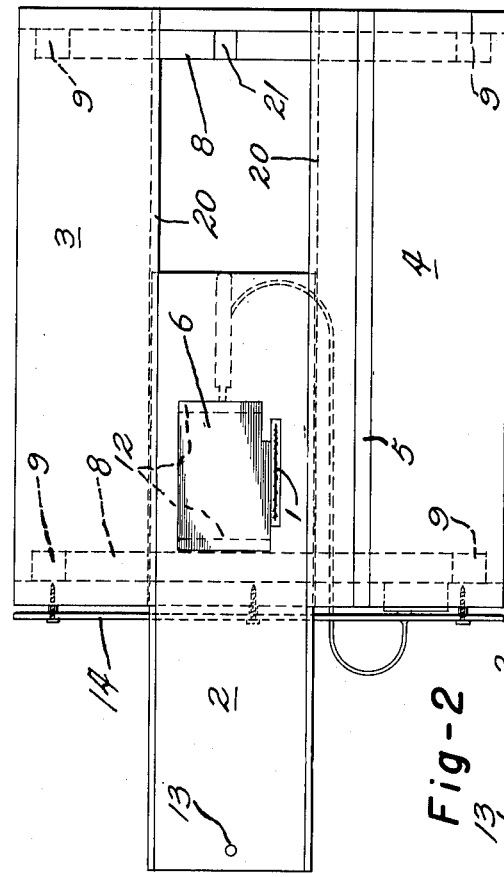
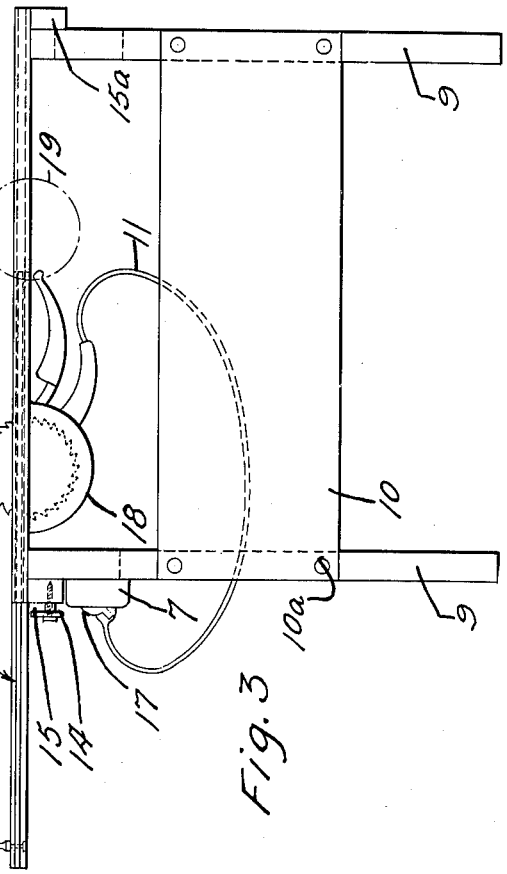
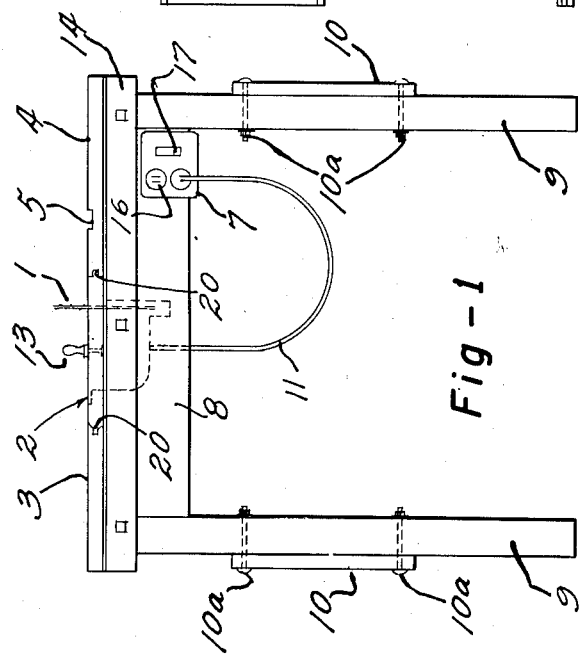
INVENTOR.
E. V. GILKEY
BY
Roy L Daily
ATTORNEY United States Patent Office 2,729,250
Patented Jan. 3, 1956

2,729,250

PORTABLE SAW TABLE CONTAINING SLIDING PORTION

Escho V. Gilkey, Marysville, Calif., assignor to Jack R. Halvorsen, Lake Forest, Ill.

Application October 13, 1952, Serial No. 314,466

2 Claims. (Cl. 143—132)

This invention relates to an improved saw bench having a movably mounted rotary saw mounted therein for engagement with the material to be cut.

It is the aim of this invention to provide a saw bench having a sliding portion in the top thereof and adapted to support a saw whereby the saw may be moved into and out of engagement with the material to be cut.

More particularly it is to furnish a portable saw table, to users of such equipment, that is light in weight and easy for one man to move from one job to another, or to dis-assemble for small storage space, or for ease of transportation as well as enabling the operator to push the saw against the material to be cut, as well as pushing the material against the saw. It will be very desirable for home craft, being furnished with a ripping fence and a "T" fence for cross cutting, adjustable to any angle from 0° to 90°.

This invention will furnish the already owner of a Guild-6 saw, or similar models, with an electric power say, usable for all types of carpenter and cabinet work. It can be used for dado work to plow grooves lengthwise and crosswise from 1/8" to 2" in depth. The saw is connected to an electric switch at easy access on the front of the frame. The power saw may be removed from table in a very short period of time to be used as a free hand electric powered saw.

Other objects and advantages of the invention will hereinafter become more fully apparent from the following description of the drawings, which illustrate a preferred embodiment thereof, and wherein Figure 1 is an end view, Figure 2 is a top plan view, and Figure 3 is a side view.

Referring more particularly to the drawing, wherein like reference characters designate like or corresponding parts throughout the different views, 1 designates a circular saw blade of a portable Guild-6 saw, or the like, attached to a sliding panel 2 which slides back and forth in the grooves 20 contained in the stationary parts 3 and 4 or panels of the table top, or which may be placed in a fixed position, if desired when we have the conventional method of moving the material against the saw; 5 is a longitudinal groove which serves as a track for an adjustable miter gage, 6 is a saw mounting plate and 7 is the switch box, 8 is a top bracing or frame member; 9 are the legs upon which the table top rests and 10 is the leg bracing, 10a are bolts for fastening the leg bracing to keep the table rigid; 11 is an electric cord to connect with the usual electric plug to obtain power to operate the saw; 12 is the saw mount recess comprising an aperture in the sliding panel 2 and having at each end of the aperture a transverse notch slightly deeper than the thickness of the saw mounting plate 6 so that when the saw mounting plate is placed into the notches the top surface of the plate 6 is substantially co-planar with or slightly below the top surface of the sliding panel 2 and 13 is a knob attached to the sliding portion of the table top to move the circular saw backward and forward; 14 is the ripping guide, 15 is the front frame member and 15a is the rear frame member both of said members being fastened to the stationary parts 3 and 4 of the table top. 16 is the socket to receive power source and 17 is the switch; 18 is the most forward position of the saw and 19 is the rear position of saw, 20 are the grooves to guide the sliding panel 2 and 21 is a notch in the top bracing member 8 to receive the protruding portion of the saw.

The entire operation of the device is simple, and requires a minimum of effort, and as the saw moves to the work, such work, even though of relatively great length, can be cut with ease.

Various modifications and changes in the construction and arrangement of the parts forming the invention may obviously be made and are contemplated and the right is therefore expressly reserved to make such modifications and changes as fall within the spirit and scope of the invention as hereinafter defined by the appended claims.

Having thus described my invention, what I claim as new and useful and desire to secure by Letters Patent is:

1. A portable saw table for a portable electric saw consisting of a supporting frame and a portable table top, said portable top comprising three adjacently positioned substantially coplanar panels of substantially equal length arranged to provide a substantially uninterrupted surface, said adjacently positioned panels arranged so that the opposed parallel side edges of the center one of said panels are in substantial abutting relation to one edge of each of the other said panels which extend laterally outwardly from said parallel edges, said latter two panels being attached to the supporting frame of said table, the center of said panels provided with an aperture offset longitudinally relative to the center of said panel to receive a saw blade, said panel being movable relative to said supporting frame and the two attached panels thereon and adapted to support the portable saw by suitable means from its surface, and cooperating means located below the plane of the table top provided at the adjacently positioned side edges of said panels consisting of complementary tongue and groove elements to interlock said panels against movement normal to the plane of the table top, but permitting sliding longitudinal movement of said movable panel to move the portable saw relative to said attached table top panels and the supporting frame.

2. A portable saw table device of the type described in claim 1 wherein handle means are provided adjacent the end of said movable panel most remote from the saw blade receiving aperture to facilitate movement of said panel relative to the other two attached panels.

References Cited in the file of this patent

UNITED STATES PATENTS

| | | |
|---|---|---|
| 1,799,215 | Colby | Apr. 7, 1931 |
| 1,848,330 | Emmons | Mar. 8, 1932 |
| 2,230,929 | Bray et al. | Feb. 4, 1941 |
| 2,594,651 | Jackson | Apr. 29, 1952 |
| 2,601,878 | Anderson | July 1, 1952 |
| 2,611,400 | Shore | Sept. 23, 1952 |